United States Patent [19]

Bhatt

[11] 4,157,584
[45] Jun. 5, 1979

[54] OVERHEAD LIGHTING FIXTURE

[75] Inventor: Yogendra C. Bhatt, Westerville, Ohio

[73] Assignee: Rohr Industries, Inc., Chula Vista, Calif.

[21] Appl. No.: 853,195

[22] Filed: Nov. 21, 1977

[51] Int. Cl.² .............................................. B60Q 3/02
[52] U.S. Cl. ........................................ 362/74; 40/574; 40/578; 40/589; 362/147; 362/223; 362/224; 362/362; 362/374; 362/404
[58] Field of Search ................. 362/74, 223, 224, 404, 362/147, 148, 367, 374, 375, 362, 368; 40/574, 578, 589

[56] References Cited

U.S. PATENT DOCUMENTS

| | | | |
|---|---|---|---|
| 2,335,737 | 11/1943 | Campen | 362/224 |
| 3,035,161 | 5/1962 | Kalt | 362/74 |
| 3,210,875 | 10/1965 | Schwenkler | 362/74 |
| 3,211,904 | 10/1965 | Schwenkler | 362/224 |
| 3,549,879 | 12/1970 | Meyer | 362/223 |
| 3,794,830 | 2/1974 | Hitzler | 362/223 |
| 4,081,665 | 3/1978 | Corbeil | 362/223 |
| 4,088,881 | 5/1978 | Neer et al. | 362/223 |

Primary Examiner—Edward A. Miller
Assistant Examiner—T. S. Gron
Attorney, Agent, or Firm—P. J. Schlesinger; F. D. Gilliam

[57] ABSTRACT

An overhead lighting fixture with the housing having an open bottom, a resilient hinge pivotally fastening a first side of the light transmitting panel to a first side of the housing adjacent the open bottom of the housing, and a latch assembly for detachably securing a second side of the light transmitting panel to a second side of the housing adjacent its open bottom. The second side of the housing is an elongated extruded side panel member having a light housing web portion and a latch web portion that lies in a plane approximately 90° thereto. The latch member has a J-shaped configuration with a head, a body, and a foot. The head of the latch member has a circular lateral cross-section that is matingly received in a groove formed in the latch web portion. This structure permits the latch member to be pivoted laterally into and out of engagement with a lip extending along the length of the light transmitting panel that rests in the curved hook surface of the J-shaped latch member. An intermediate web portion is integrally formed at an approximately 90° angle to the latch web portion. Compressible foam tape is positioned between the J-shaped latch member and the intermediate web member to keep the latch member biased in engagement with the edge of the light transmitting panel. The intermediate web portion also forms a part of the support structure for a passenger hand assist rail assembly.

11 Claims, 2 Drawing Figures

OVERHEAD LIGHTING FIXTURE

BACKGROUND OF THE INVENTION

The invention relates to a lighting fixture in general and more specifically is directed toward an overhead lighting fixture for a transit vehicle that is to provide general overhead illumination and also to provide a structure to display advertising material that would be illuminated from its rear surface.

In the past overhead lighting fixtures have been known that were used in transit vehicles to provide general transit vehicle illumination and also to display advertising material. Most of these lighting fixtures had housings of various configurations that were attached to the cornice interior area of the transit vehicle. Due to the different curvatures of the cornice area in the many transit vehicles special housings were required to fit the individual configurations or attempts were made to make the housing fit the corner area as best as possible.

In addition to the overhead lighting fixture, most transit vehicles have overhead passenger hand assist rails that are attached in some manner to the ceiling of the vehicle. Previous overhead light fixtures made no attempt to combine their structure with the passenger hand assist rails.

Periodically fluorescent lights in the overhead light fixture burn out, and this necessitates the changing of the bulb. Numerous latching structures have been developed, but most of these incorporate fasteners which become bothersome or which do not function properly or are difficult to operate.

It is an object of the invention to provide a novel overhead lighting fixture that utilizes the ceiling of the transit vehicle for a part of the light housing.

It is also an object of the invention to provide an overhead lighting fixture that incorporates a part of the passenger hand assist rail assembly support structure as a side of the lighting fixture housing.

It is a further object of the invention to provide a novel overhead lighting fixture that allows for easy installation and removal of light panels without working with fasteners.

It is an additional object of the invention to provide a novel overhead lighting fixture having a novel latching structure.

SUMMARY OF THE INVENTION

The overhead lighting fixture is unique in that it incorporates the ceiling of the vehicle as the top of the light fixture housing. Also, one side panel of the light fixture is formed from an extruded member that also forms part of the support structure for the passenger hand assist rail assembly that is mounted to the ceiling of the vehicle. Another side of the light fixture housing is formed by the support panel that functions to support the fluorescent light sockets. The light fixture housing is basically open at its bottom with a lower housing extruded panel attached to the bottom of the light socket support panel. The light transmitting panel has its one side pivotally hinged to the lower housing panel extrusion and its opposite side has a lip that is engaged by the novel latch structure of the light fixture.

The novel latch structure is J-shaped in configuration and has a head, a body and a foot. The head of the latch member has a circular lateral cross-section to permit it to be pivoted laterally into and out of engagement with the lip on the edge of the light transmitting panel. The head of the latch member is received in a groove having a configuration to matingly receive the head of the latch and this groove is integrally formed in the latch web portion of the extruded side panel. The side panel is comprised of the light housing web portion, the latch web portion that is formed at substantially 90° angle thereto, and the intermediate web portion that is formed at a substantially 90° angle to the latch web portion. A compressible foam tape is positioned between the intermediate web portion and the body of the latch to keep the latch member in biased engagement with the edge of the light transmitting panel. Also integrally formed in the latch web portion is a C-shaped channel that receives the T-shaped cross-section of a hollow rubber extrusion that has its lower side pressed into engagement with the top of the light transmitting panel. This hollow rubber extrusion also functions to keep the lip of the light transmitting panel biased against the hook shaped foot of the latch member.

DESCRIPTION OF THE PREFERRED EMBODIMENT

Figure 1:
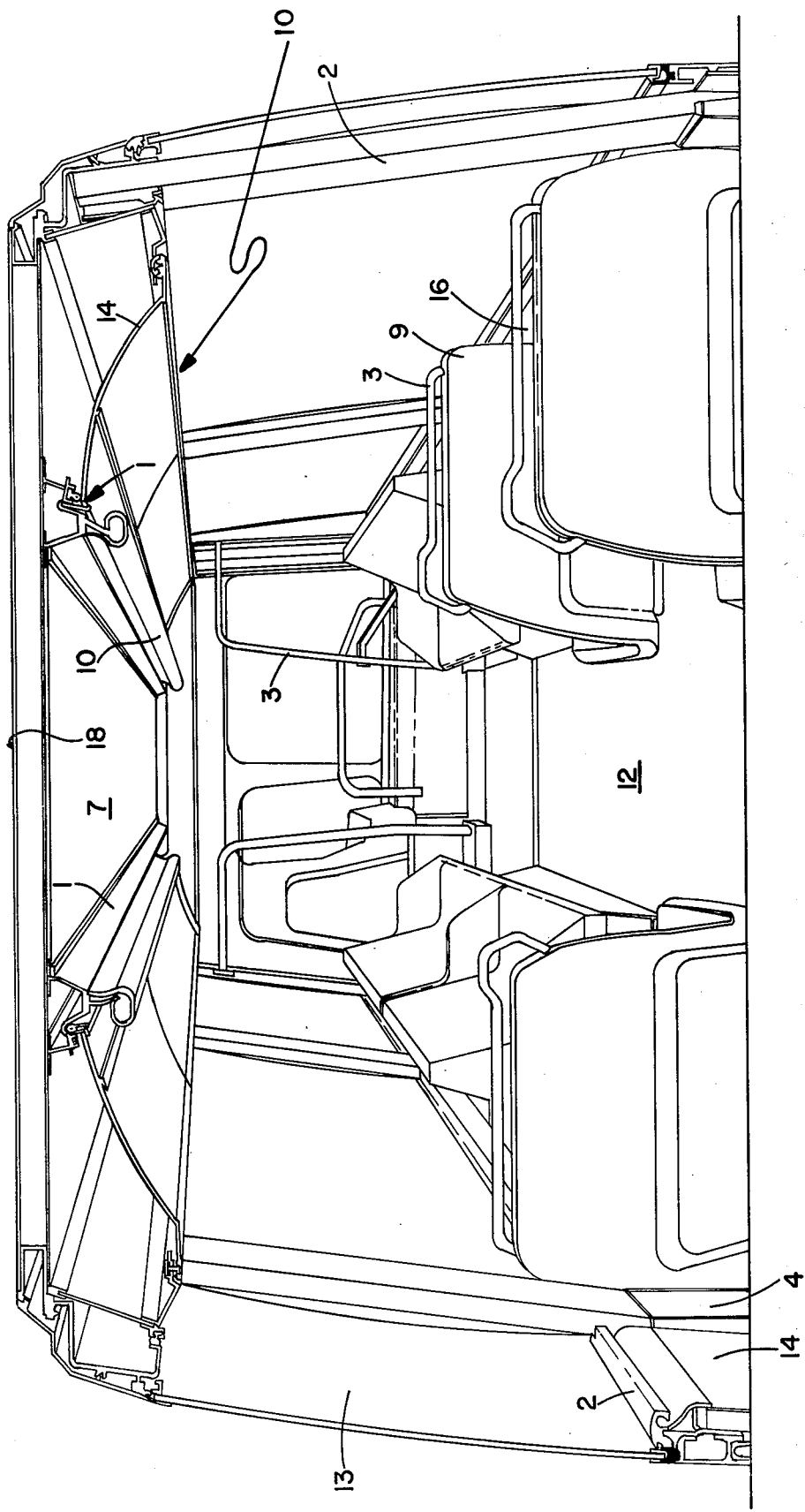
FIG. 1 is a perspective view illustrating the interior of a transit vehicle having the novel overhead lighting fixture mounted therein.
Figure 2:
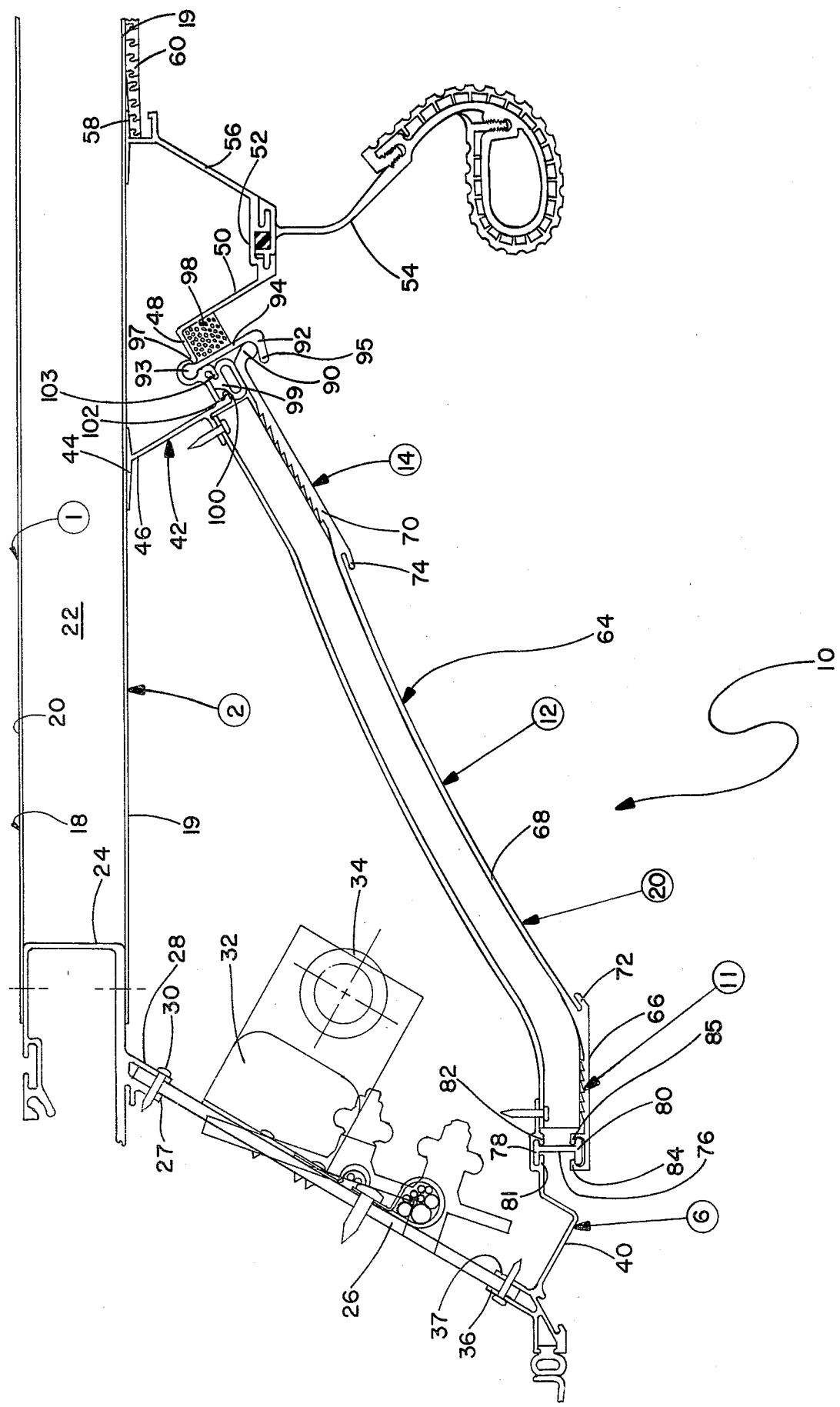
FIG. 2 is a side elevation view of the overhead lighting fixture.

The overhead lighting fixture will be described by referring to FIGS. 1 and 2. The overhead lighting fixture is generally designated numeral 10. It is mounted in a transit vehicle having a floor 12, sidewalls 14 and 16, and roof 18. The roof 18 is comprised of two spaced sheets 19 and 20 of metal such as aluminum, with a space between filled with foamed plastic 22. The lateral edges of the roof are closed by channel shaped extrusions 24. The roof 18 forms the top of the light fixture housing.

One sidewall of the light fixture housing is formed by a plywood support panel 26. The top of the support panel is secured between flanges 27 and 28 that extend downwardly from channel shaped extrusion 24. Support panel 26 is secured in place by fasteners 30. The light sockets 32 are attached to the interior side of support panel 26 for mounting the fluorescent light 34. The bottom of support panel 26 is captured between flanges 36 and 37 that extend upwardly from the extruded lower housing panel 40.

The other lateral side of the light fixture housing is formed by side panel 42. This member is an extruded panel having a mounting flange 44, a light housing web portion 46, a latch web portion 48, and an intermediate web portion 50. Latch web portion 48 is formed substantially at a 90° angle to light housing web portion 46. Likewise, intermediate web portion 50 is substantially formed at a 90° angle to latch web portion 48. The web portion 52 that extends horizontally from the intermediate web portion 50 provides a mounting structure for the passenger hand assist rail assembly 54. A web portion 56 extends upwardly from the hand rail attachment web portion and has its upper extremity a mounting flange 58 that is attached to the ceiling 19. Carpeting or a ceiling liner 60 covers the ceiling surface outside of the overhead light fixture housing.

Light transmitting panel 64 covers the open bottom of the light fixture housing. It has a lens section 66, a lens display section 68, and a lens section 70. Flanges 72 and 74 function to hold display material between them and in contact with the light transmitting panel. The one side of the light transmitting panel 64 is pivotally attached to lower housing panel 40 by a resilient hinge 76. The hinge is substantially I-shaped in cross-section having a thickened upper edge portion 78 and a lower thickened edge portion 80. Edge portion 78 is captured by lips 81 and 82 of the lower housing panel 40. Edge portion 80 of the hinge are captured by lips 84 and 85 of the light transmitting panel. When changing the lights of the light fixture, the light transmitting panel may hinge downwardly in a vertical position about hinge member 76.

The upper end of light transmitting panel 64 has a lip 90 portruding downwardly therefrom. Lip 90 is captured by the latch assembly 92. The latch is J-shaped and has a head 93, a body 94, and a foot 95. Head 93 has a circular lateral cross-section to permit it to be pivoted laterally into and out of engagement with lip 90 of the light transmitting panel. Head 93 is captured within groove 97 formed in the latch web portion. Compressible foam tape 98 is positioned between the body 94 of the latch and intermediate web portion 50 to bias the latch member into engagement with lip of the light transmitting panel. A hollow rubber extrusion 99 has its T-shaped upper portion captured in C-shaped channel 100 that is formed integrally in latch web portion 48. Lips 102 and 103 capture the top of the hollow extrusion member.

From the above description it is clear that the light transmitting panel can easily be unlatched by merely pushing the latch against the compressible foam tape 98 while lifting slightly on the light transmitting panel further compressing extrusion 99 until lip 90 has cleared foot 95 of the latch. After that the light transmitting panel is free to pivot downwardly about hinge 76. At this point any burned out fluorescent lights may be replaced quite easily and upon completion of this task, the light transmitting panel can be pivoted upwardly until its upper edge compresses hollow rubber extrusion 99 while latch 92 is then pivoted out of the way. When lip 90 has cleared the foot of the latch, the latch may be allowed to pivot back to its normal position and lockingly engage the light transmitting panel.

What is claimed is:

1. An overhead light fixture for a transit vehicle comprising:
   a housing having an open top and bottom, the ceiling of said transit vehicle forming the closure for said open top,
   means hinging a first side of said light transmitting panel to a first side of said housing adjacent the open bottom of said housing,
   latch means for detachably securing a second side of said light transmitting panel to a second side of said housing adjacent its open bottom,
   said second side of said housing comprising a panel member having a light housing web portion and a latch web portion, said latch web portion having a groove formed therein, said latch means also comprising a latch member having a head, a body, and a foot, said groove in said latch web portion having a configuration to matingly receive the head of said latch and
   first and second biasing means for urging continuing engagement of said latch member with the edge of said light transmitting panel when said second side is secured by said latch member.

2. An overhead lighting fixture as recited in claim 1 wherein the head of said latch member has a circular lateral cross section to permit it to be pivoted laterally into and out of engagement with the edge of said light transmitting panel.

3. An overhead lighting fixture as recited in claim 1 wherein said latch web portion lies in a plane formed approximately at a 90° angle to the plane of said light housing web.

4. An overhead lighting fixture as recited in claim 1 wherein said light housing web portion and said latch web portion are integrally formed as an extruded side panel.

5. An overhead lighting fixture as recited in claim 1 wherein said first biasing means is compressible foam tape.

6. An overhead lighting fixture as recited in claim 1 wherein said latch member has a J-shaped cross sectional configuration.

7. An overhead lighting fixture as recited in claim 1 wherein said second biasing means comprises a hollow rubber extrusion member with a T-shaped head, said latch web portion having a C-shaped channel formed with locking lips that receive said T-shaped head to hold said hollow rubber extrusion member with its bottom in compressed engagement against the top edge of said light transmitting panel.

8. An overhead lighting fixture as recited in claim 6 wherein the edge of said light transmitting panel has a lip extending along its length that rests in the curved hook surface of said J-shaped latch member.

9. An overhead lighting fixture as recited in claim 1 further comprising an intermediate web portion integrally formed at approximately a 90° angle to said latch web portion, said intermediate web portion forming a part of the support structure for a passenger hand assist rail assembly.

10. An overhead lighting fixture as recited in claim 1, wherein said first and second biasing means bias said latch member along first and second planes, said planes forming an angle of approximately 90°.

11. An overhead lighting fixture as recited in claim 1, wherein said means hinging said light transmitting panel comprising a resilient hinge member having a substantially "I" configured cross-section that is fixedly attached at the flat end portions and bends intermediate those end sections to provide the hinging action.

* * * * *